Sept. 6, 1938.  G. H. LANCASTER  2,129,144
LIQUID METER
Filed Sept. 17, 1937
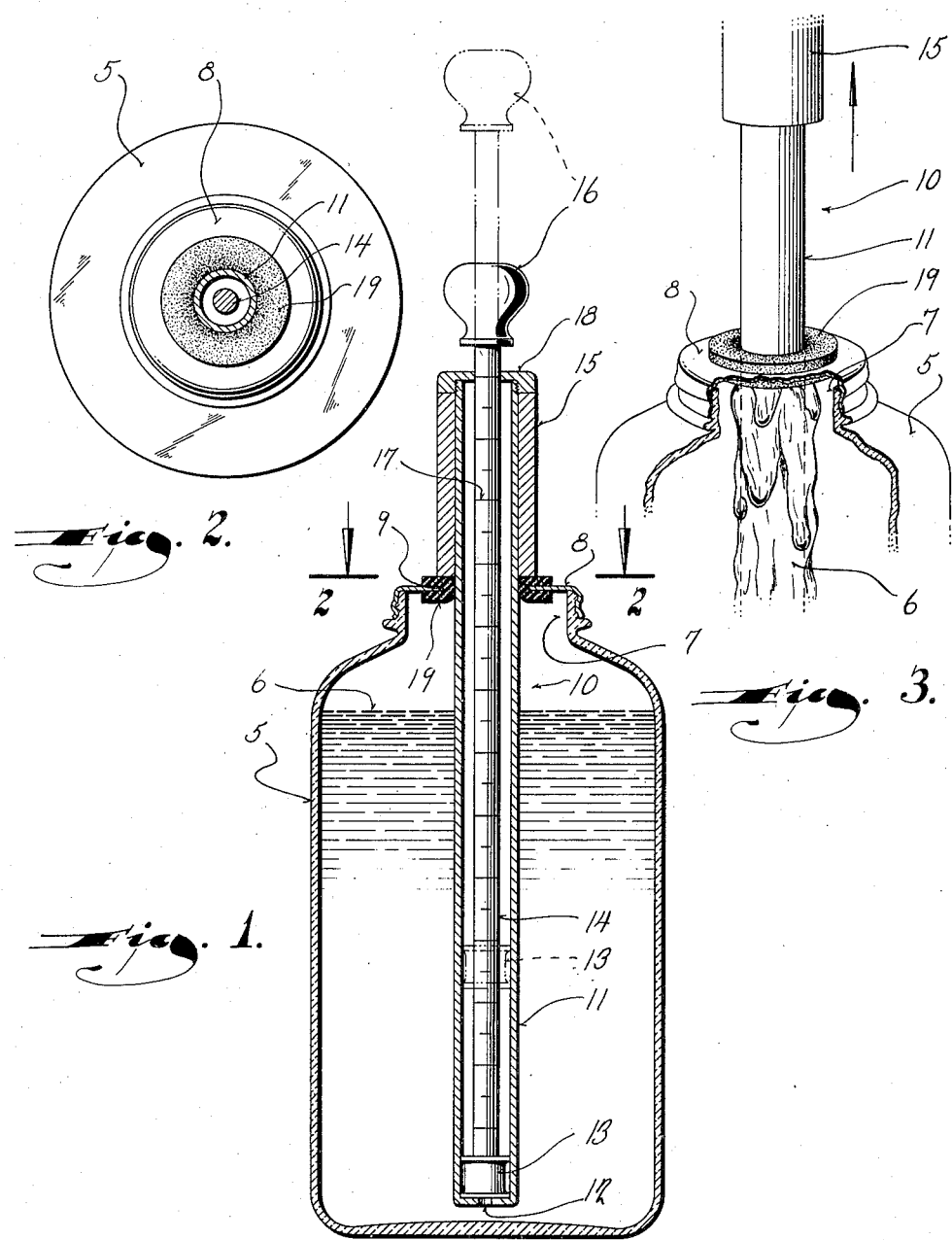
Inventor
Graham H. Lancaster Patented Sept. 6, 1938

2,129,144

UNITED STATES PATENT OFFICE 2,129,144

LIQUID METER

Graham H. Lancaster, Los Angeles, Calif., assignor to Lancaster Inc., Los Angeles, Calif., a corporation of California Application September 17, 1937, Serial No. 164,295

1 Claim. (Cl. 221—147)

This invention relates to improvements in liquid meters and refers particularly to a portable device for withdrawing or removing measured quantities of liquid or other material from a container holding a supply of such material.

In the handling of certain materials, such as highly concentrated extracts, it is essential that maximum accuracy in measurement of the materials be assured, but accuracy must not be obtained at the expense of quick handling.

This invention therefore has as an object to provide a simple, easily operated measuring device insertable into a container holding a supply of liquid and having means operable to suck a measured quantity of the liquid into its interior.

Another object of this invention resides in the provision of means for stripping off or removing all excess material from the exterior of the measuring device as it is withdrawn from the container.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawing illustrates one complete example of the physical embodiment of the invention constructed in accordance with the best mode so far devised for the practical application of the principles thereof, and in which:

Figure 1 is a vertical sectional view through a liquid meter embodying this invention;

Figure 2 is a cross sectional view taken through Figure 1 on the plane of the line 2—2; and Figure 3 is a perspective view illustrating the manner in which excess material is stripped off the extracting device during its withdrawal from the container.

Referring now particularly to the accompanying drawing in which like numerals indicate like parts, the numeral 5 designates a container to hold a quantity of liquid 6, or other material to be dispensed or withdrawn in measured quantities.

The container 5 may be of any desired design or construction, and in the present instance is illustrated as an open topped portable jar having its mouth 7 closed by a cover or cap 8. The cover or cap has a hole 9 through which an extracting device, indicated generally by the numeral 10, is insertable to be immersed in the contents of the container.

The extracting device 10 consists of a tube or cylinder 11 closed at its lower end except for a restricted opening 12 and having a plunger 13 slidable therein. The plunger 13 is carried at the lower end of a rod 14 which extends up through the tube or cylinder to project through a handle 15 fixed to the upper end of the tube. The upper extremity of the rod 14 has a knob 16 by which the plunger may be reciprocated within the tube.

The rod 14 has a graduated scale 17 delineated thereon which coacts with the top surface 18 of the handle to provide an accurate measurement of the amount of liquid drawn or sucked into the tube or cylinder upon retraction of the plunger 13.

The operation of the device is exceedingly simple, for as will be clear from the disclosure, it is only necessary to insert the tube or cylinder through the hole 9 into the contents of the container and then withdraw the plunger 13 the desired distance, as indicated by the scale 17 coacting with the surface 18, whereupon the desired quantity of liquid will have been drawn into the cylinder or tube. In view of the restricted size of the opening 12, the material drawn into the cylinder remains therein if care is taken not to allow the plunger to move downwardly during the withdrawal of the tube from the container.

To insure maximum accuracy, any material which adheres to the exterior of the tube is stripped off during its withdrawal from the container by a rubber collar 19 fixed in the hole 9 of the cap and having a tight frictional engagement with the exterior of the tube. The collar 19 thus functions substantially like a squeegee during the withdrawal of the tube from the container and strips off all material adhering to the exterior of the tube regardless of its consistency.

From the foregoing description taken in connection with the accompanying drawing, it will be readily apparent to those skilled in the art that this invention provides a simple device for withdrawing a measured quantity of liquid or other material from a container, and that accuracy is assured by automatically stripping off all excess material from the exterior of the measuring device during its withdrawal from the container.

What I claim as my invention is:

A device of the character described comprising: a container adapted to hold a supply of liquid; a cap to close the top of the container, said cap having a hole therethrough; a tube insertable through said hole into the liquid, said tube being long enough to reach substantially to the bottom of the container while a portion thereof projects above the cap; a hand grip fastened to the upper end of the tube, said hand grip having sufficient length to permit the same to be firmly grasped in one hand and its lower end providing an abrupt shoulder, the upper end of the hand grip closing the top of the tube except for a guide hole; a plunger reciprocal in the tube for sucking liquid into it; a plunger rod extending up from the plunger and through the guide hole; a knob on the upper end of the plunger rod whereby the plunger is readily reciprocal when the hand grip is firmly held and without entailing contact of the hands with any part of the tube or the plunger rod; and means at the edge of the hole in the cap engageable by the shoulder at the bottom of the hand grip to limit insertion of the tube into the container and to frictionally engage the side of the tube and strip off excess liquid from the tube during its withdrawal from the container.

GRAHAM H. LANCASTER.